United States Patent
Huang et al.

(10) Patent No.: US 12,482,807 B2
(45) Date of Patent: Nov. 25, 2025

(54) RECHARGEABLE ALKALINE BATTERY COMPRISING METAL HYDROXIDE SEPARATOR

(71) Applicant: RESEARCH FOUNDATION OF THE CITY UNIVERSITY OF NEW YORK, New York, NY (US)

(72) Inventors: Jinchao Huang, New York, NY (US); Gautam G. Yadav, New York, NY (US); Joshua Gallaway, New York, NY (US); Michael Nyce, New York, NY (US); Sanjoy Banerjee, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 498 days.

(21) Appl. No.: 15/765,667

(22) PCT Filed: Oct. 5, 2016

(86) PCT No.: PCT/US2016/055467
§ 371 (c)(1),
(2) Date: Apr. 3, 2018

(87) PCT Pub. No.: WO2017/062435
PCT Pub. Date: Apr. 13, 2017

(65) Prior Publication Data
US 2019/0088915 A1    Mar. 21, 2019

Related U.S. Application Data

(60) Provisional application No. 62/237,037, filed on Oct. 5, 2015.

(51) Int. Cl.
*H01M 50/431* (2021.01)
*H01M 4/24* (2006.01)
(Continued)

(52) U.S. Cl.
CPC ............. *H01M 4/30* (2013.01); *H01M 4/244* (2013.01); *H01M 10/24* (2013.01); *H01M 10/30* (2013.01);
(Continued)

(58) Field of Classification Search
None
See application file for complete search history.

(56) References Cited

FOREIGN PATENT DOCUMENTS

| EP | 0136172 B1 | 4/1990 |
|----|------------|--------|
| EP | 0520990 B1 | 1/1997 |

(Continued)

OTHER PUBLICATIONS

Freestanding, Merriam-Webster Dictionary (Apr. 18, 2025), https://www.merriam-webster.com/dictionary/freestanding.*

(Continued)

*Primary Examiner* — Tracy M Dove
(74) *Attorney, Agent, or Firm* — Andrew M. Metrailer; Conley Rose, P.C.

(57) ABSTRACT

A rechargeable alkaline battery includes an anode comprising zinc, a cathode, and separator disposed between the anode and the cathode. The separator comprises a water-insoluble metal hydroxide. For example, the water-insoluble metal hydroxide can be magnesium hydroxide, calcium hydroxide, strontium hydroxide, barium hydroxide, or any combination thereof. The separator comprising the water-insoluble metal hydroxide can serve to capture a portion of any zincate ions produced at the anode prior to the zincate ions passing through the separator to the cathode.

9 Claims, 8 Drawing Sheets

(51) Int. Cl.
    *H01M 4/30*      (2006.01)
    *H01M 10/24*     (2006.01)
    *H01M 10/30*     (2006.01)
    *H01M 50/403*    (2021.01)
    *H01M 50/446*    (2021.01)
    *H01M 50/457*    (2021.01)
    *H01M 50/46*     (2021.01)

(52) U.S. Cl.
    CPC ....... *H01M 50/403* (2021.01); *H01M 50/431* (2021.01); *H01M 50/446* (2021.01); *H01M 50/457* (2021.01); *H01M 50/46* (2021.01)

(56) References Cited

FOREIGN PATENT DOCUMENTS

| EP | 0695465 B1 | 1/2000 |
| WO | 9312551 A1 | 6/1993 |
| WO | 2010058901 A2 | 5/2010 |
| WO | 2017062435 A1 | 4/2017 |

OTHER PUBLICATIONS

*Free-Standing, adj.*, Oxford English Dictionary (Apr. 18, 2025), https://www.oed.com/dictionary/free-standing_adj?tab=meaning and_use& tl=true#3668113100.*

International Search Report and Written Opinion of International Application No. PCT/US2016/055467, dated Jan. 6, 2017, 15 pages.

International Preliminary Report on Patentability of International Application No. PCT/US2016/055467, dated Apr. 19, 2018, 12 pages.

* cited by examiner

RECHARGEABLE ALKALINE BATTERY COMPRISING METAL HYDROXIDE SEPARATOR

CROSS-REFERENCE TO RELATED APPLICATIONS

This application is a filing under 35 U.S.C. 371 as the National Stage of International Application No. PCT/US2016/055467, filed Oct. 5, 2016 and entitled "Rechargeable Alkaline Battery Comprising Metal Hydroxide Separator", which claims the benefit of and priority to U.S. Provisional Application No. 62/237,037 filed on Oct. 5, 2015 and entitled "Rechargeable Alkaline Battery Comprising Metal Hydroxide Separator" by Jinchao Huang et al., both of which are incorporated herein by reference in their entirety.

STATEMENT REGARDING FEDERALLY FUNDED RESEARCH OR DEVELOPMENT

This invention was made with government support under grant number DE-AR0000150 awarded by Advanced Research Projects Agency-Energy—U.S. Department of Energy (ARPA-E). The government has certain rights in the invention.

BACKGROUND

Alkaline battery cells have been predominantly used as primary batteries (e.g., primary batteries, primary electrochemical cells or primary cells), meaning that after a single discharge primary batteries are disposed of and replaced. Primary alkaline batteries are produced in high volume at low cost by numerous commercial manufacturers. However, the one-time use of primary batteries results in large material wastage as well as undesirable environmental consequences. Also, potential economic losses can arise due to the significant imbalance between the energy that is required to manufacture these cells compared to the energy that can actually be stored. As a consequence, there is an advantage to providing rechargeable or secondary cells, also known as secondary batteries, secondary electrochemical cells or secondary cells.

SUMMARY

A secondary alkaline zinc battery with an inorganic separator was described. The inorganic separator was developed from water insoluble hydroxides of metals selected from the alkaline earth metal group mixed with binders. Cells with our innovative separators showed ability to achieve higher capacity retentions and energy densities compared to other cells with commercial separators.

In an embodiment, a rechargeable alkaline battery comprises: an anode comprising zinc, a cathode, and a separator disposed between the anode and the cathode. The separator comprises a water-insoluble metal hydroxide.

In an embodiment, a method for fabricating a separator comprises combining an inorganic material with a binder to form a mixture, and forming the mixture into a sheet of separator material. The separator material is used in a rechargeable alkaline battery.

In an embodiment, a method of operating a rechargeable alkaline battery comprises discharging the rechargeable alkaline battery, producing zincate ions at the anode, and capturing the zincate ions in the separator prior to the zincate ions migrating from the anode to the cathode. The rechargeable alkaline battery comprises: an anode comprising zinc, a cathode comprising manganese dioxide, a separator disposed between the anode and the cathode, the separator comprising a water-insoluble metal hydroxide, and an electrolyte flooding the anode, the cathode, and the separator.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
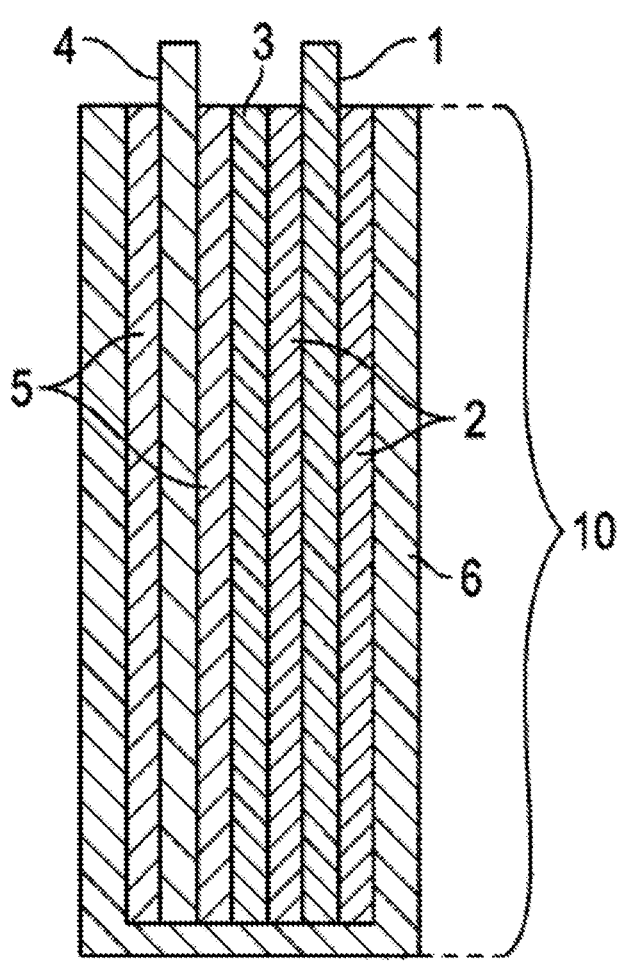
FIG. 1 is a schematic cross-sectional view of a cell according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The work described in this disclosure mainly relates to an inorganic separator with a porous structure for application in rechargeable alkaline batteries, to prevent the migration of zinc and zincate ions through one or more separators.

Zinc and its compounds show outstanding qualities as a material for battery electrodes, such as low equilibrium potential, compatibility with aqueous electrolytes, high energy density, low cost, and low toxicity. They have been used in various primary battery systems, including zinc/nickel oxyhydroxide (Zn/NiOOH), zinc/air, zinc/silver oxide (Zn/Ag$_2$O), and zinc/manganese dioxide (Zn/MnO$_2$) systems. Among all the commercially available primary batteries, Zn/MnO$_2$ is the most popular, as zinc and manganese are inexpensive, safe and earth-abundant materials, and the Zn/MnO$_2$ primary battery is able to provide very good performance at low cost.

However, attempts to convert the Zn/MnO$_2$ battery system into a secondary (or rechargeable) battery have met with only limited success over the past decades. Deterioration of both Zn and MnO$_2$ electrodes during cycling is the primary reason for failure. As used herein cycling the cell or battery refers to both charging and discharging the cell or battery. Problems usually occur on zinc electrodes during cycling include the redistribution of active zinc materials, formation of unwanted morphologies, and zinc electrode passivation. On the MnO$_2$ side, the conventionally used material, electrolytic manganese dioxide (EMD) only cycles at a relatively shallow depth of discharge compared to its full 2 electron based theoretical capacity. When the reduction proceeds beyond the 1st electron, side reactions occur and irreversible oxides, such as Mn$_2$O$_3$ and Mn$_3$O$_4$ are formed. Additionally, when the Zn electrode and MnO$_2$ electrode are cycled in a full cell, the zinc ions, that are formed during discharge, will migrate to the cathode side and negatively affect the MnO$_2$ electrode's performance by forming several irreversible compounds, in particular poorly conductive and electrochemically inactive hetaerolite (ZnMn$_2$O$_4$) that eventually leads to cell failure.

While the need to mitigate the first two problems, related to the deterioration of the Zn and manganese dioxide electrodes due to cycling, have been the focus of intensive research, effort is also necessary to find ways to mitigate the MnO$_2$ electrode's failure caused by reactions with zinc ions. This last problem has perhaps been considered less crucial due to the fact that zincate ions do not affect severely on the cell performance, when only a shallow depth of discharge is reached. However, to increase the competitiveness of the Zn—MnO$_2$ cells it becomes attractive to achieve higher battery energy density by accessing the 2nd electron capacity of MnO$_2$, which increases the significance of the zincate ions reducing the available MnO$_2$ capacity by forming hetaerolite. Thus, in one embodiment, an objective of this disclosure is to reduce or prevent the mobilization of zinc ions to reduce or prevent them from affecting the MnO$_2$ electrode. The ability to control the movement of zinc ions can also be applicable to other battery systems which use other cathode materials, for example, Zn—NiOOH, Zn—Ag$_2$O, etc.

To the end of zinc immobilization, work has been done either on development of ionic selective membranes, or on reduction of the solubility of zincate by modifying the electrolyte or the zinc electrode itself. When designing a selective separator for the battery, it is desirable that zinc ions are blocked, while the free movement of hydroxyl ions is not affected. This contradictory requirement presents the biggest challenge, and may be the reason why not much success on blocking zincate with separators has been reported in the literature. Some approaches have tried to coat either the membrane or the zinc electrode with sulfonated poly(2.6-dimethyl-1.4-phenylene oxide) (SPPO), which showed that a better rechargeability of the Zn—MnO$_2$ battery, with 80% initial accessibility of theoretical 2-electron capacity and about 12% decline after about 50 cycles, could be achieved. However, the separator prepared in this way showed an increased resistivity, and sufficiently long cycle life was not reported in the patent, probably because cells with ion-exchange membranes are usually faced with problems of instability in concentrated alkaline solutions, and more rapid shape change due to higher concentration gradient on the anode side. Another approach applied an anion-exchange polysulfonium membrane as the separator to the zinc air system, and claimed blockage of zinc ions. However, KOH solution with concentration less than 1 M (~5 wt %) was required to make their separator effective, in which case the zinc ions were thought to be Zn$^{2+}$, and differed fundamentally from our system where the KOH concentrations are much higher.

The disclosed separator took a different approach by applying materials, such as a complexing agent, that are able to reversibly react with zincate ions onto the separator. In this case, the separator serves as a zincate reservoir, capturing and storing zincate ions during discharge and releasing them back to the electrolyte during charge. In some embodiments, the inorganic materials that are particularly useful mainly refer to water insoluble hydroxides of metals selected from the alkaline earth metal group. Suitable metal hydroxides can include, but are not limited to, magnesium hydroxide, calcium hydroxide, strontium hydroxide, barium hydroxide, or any combination thereof. Among all these materials, calcium hydroxide is especially desirable, as its reaction with zincate ions follows a reversible and fast kinetics.

Also disclosed herein is a method for fabrication of an inorganic separator. The transport properties of different separators alone, and in cells that comprised manganese dioxide cathodes, zinc anodes, and the different separators were tested. The cells with the presently described separator indicated the ability to achieve higher capacity retention and energy densities compared to cells with commercial separators alone.

Figure 2:
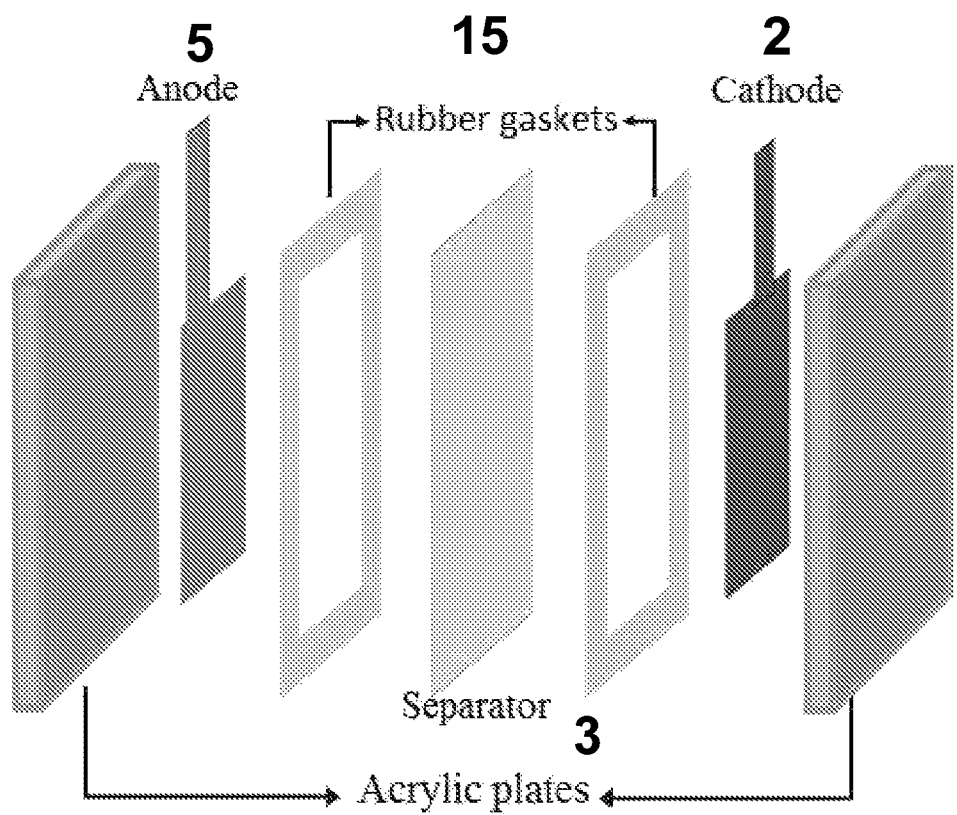
FIG. 2 is a schematic presentation of a two-chamber cell according to an embodiment.

FIG. 1 and FIG. 2 illustrates various views of a battery or cell 10 having a housing 6, a cathode current collector 1, a cathode material 2, a separator 3, an anode current collector 4, and an anode material 5. An electrolyte is dispersed in an open space throughout the battery 10. In some contexts, the combination of the cathode current collector 1 and the cathode material 2 are collectively referred to as either the cathode or the positive electrode. In some contexts, the combination of the anode current collector 4, and the anode material are collectively referred to as either the anode or the negative electrode.

In an embodiment, the housing can comprise a molded box or container, such as a thermoplastic polymer molded box (e.g., a polysulfone molded box), a thermoplastic olefin polymer molded box, or the like. As shown in FIG. 1, the electrodes may be in a prismatic geometry/configuration. While prismatic configurations are illustrated in FIG. 1, other, non-prismatic designs can also be used. For example, a cylindrical or other design can also be used with the appropriate configuration of the electrodes and separator.

The cathode material 2 can comprise a variety of materials that are suitable for use with an anode material 5 comprising zinc such as nickel oxyhydroxide (Zn/NiOOH), silver oxide (Zn/Ag$_2$O), and/or manganese dioxide (Zn/MnO$_2$). In some embodiments, the cathode material 2 can comprise a mixed material comprising manganese dioxide. The mixed material can be a combination of manganese dioxide (MnO$_2$, also referred to as MD), a conductive material, and a binder. In some embodiments, additional materials including bismuth and copper can be present with the manganese dioxide. In an embodiment, conductive carbon is also present in the cathode material 2. The mixed cathode material 2 can be based on one or many polymorphs of MnO2, including electrolytic (EMD), α-MnO2, β-MnO2, γ-MnO2, δ-MnO2, ε-MnO2, or λ-MnO2.

The cathode material 2 can also comprise a conductive material such as a conductive carbon. The addition of the conductive carbon may enable high loadings of MnO$_2$ in the mixed material, resulting in high volumetric and gravimetric energy density. The conductive carbon can be present in an amount between about 2 wt. % to about 30 wt %. Such conductive carbon can include single walled carbon nanotubes, multiwalled carbon nanotubes, graphene, carbon blacks of various surface areas, and others that have specifically very high surface area and conductivity. Higher loadings of the MnO$_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB, and any combinations thereof.

In some embodiments, the cathode material 2 can include a binder. The binder can be present in an amount of between about 0.01 wt. % to about 10 wt. %. In an embodiment, the binder comprises a water-soluble cellulose-based hydrogel, which are used as thickeners and strong binders, and are cross-linked with good mechanical strength with conductive polymers. The binder may also be a cellulose film sold as cellophane. The binders can be made by physically cross-linking the water-soluble cellulose-based hydrogels with a polymer through repeated cooling and thawing cycles. In some embodiments, a carboxymethyl cellulose (CMC) solution in an amount between about 0.01 wt. % and about 10 wt. % can be cross-linked with between about 00.01 wt. % and about 10 wt. % polyvinyl alcohol (PVA) on an equal volume basis. The binder, compared to TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders.

The binder can include hydrogels. Examples of suitable hydrogels can include, but are not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In an embodiment, a 0.01 wt. % to 10 wt % solution of water-cased cellulose hydrogen is cross linked with a 0.01 wt. % to 10% wt solution of crosslinking polymers by, for example, repeated freeze/thaw cycles, radiation treatment or chemical agents (e.g. epichlorohydrin). The aqueous binder may be mixed with between about 0.01 wt % and about 5 wt. % TEFLON® to improve manufacturability.

The cathode material 2 can be adhered to the cathode current collector 1 by pressing at, for example, a pressure between 1,000 psi and 20,000 psi. The cathode material 2 may be adhered to the cathode current collector 1 as a paste and/or as a pre-dried sheet. A tab of each current collector extends outside of the device to provide for an electrical connection to the cathode current collector 1. In some embodiments, the tab may cover less than 0.2% of the electrode area.

The cathode current collector 1 may be a conductive material to serve as an electrical connection between the cathode material 2 and the external electrical connections. In some embodiments, the cathode current collector 1 can be, for example, nickel, nickel-coated steel, tin-coated steel, silver coated copper, copper plated nickel, nickel plated copper or similar material. The cathode current collector 1 may be formed into an expanded mesh, perforated mesh, foil or a wrapped assembly.

The anode material 5 comprises zinc, which can be present as elemental zinc or zine oxide. In some embodiments, the non-flow cell Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material 5. In an embodiment, Zn may be present in an amount of about 85 wt. %, based on the total weight of the anode material 5.

In some embodiments, ZnO may be present in an amount of from about 5 wt. % to about 20 wt. %, alternatively from about 5 wt. % to about 15 wt. %, or alternatively from about 5 wt. % to about 10 wt. %, based on the total weight of anode material 5. In an embodiment, ZnO may be present in anode material 5 in an amount of about 10 wt. %, based on the total weight of the anode material 5. As will be appreciated by one of skill in the art, and with the help of this disclosure, the purpose of the ZnO in the non-flow cell Zn anode mixture is to provide a source of Zn during the recharging steps, and the zinc present in either form can be converted during charging and discharging phases.

In an embodiment, an electronically conductive material may be present in the anode material 5 in an amount of from about 5 wt. % to about 20 wt. %, alternatively from about 5 wt. % to about 15 wt. %, or alternatively from about 5 wt. % to about 10 wt. %, based on the total weight of the anode material 5. In an embodiment, the electronically conductive material may be present in anode material 5 in an amount of about 10 wt. %, based on the total weight of the anode material 5. As will be appreciated by one of skill in the art, and with the help of this disclosure, the electronically conductive material is used in the non-flow cell Zn anode mixture as a conducting agent, e.g., to enhance the overall electronic conductivity of the non-flow cell Zn anode mixture. Nonlimiting examples of electronically conductive material suitable for use in in this disclosure include carbon, graphite, graphite powder, graphite powder flakes, graphite powder spheroids, carbon black, activated carbon, conductive carbon, amorphous carbon, glassy carbon, and the like, or combinations thereof.

The anode material 5 may also comprise a binder. In an embodiment, the binder can comprise any of the binders used with the cathode material 2 as described Generally, a binder functions to hold the electroactive material particles (e.g., Zn used in anode, etc.) together and in contact with the current collector. In an embodiment, the binder may be present in anode material 5 in an amount of from about 2 wt. % to about 10 wt. %, alternatively from about 2 wt. % to about 7 wt. %, or alternatively from about 4 wt. % to about 6 wt. %, based on the total weight of the anode material 5. In an embodiment, the binder may be present in anode material 5 in an amount of about 5 wt. %, based on the total weight of the anode material 5.

In an embodiment, the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrene-sulfonate (PEDOT:PSS), polyvinyl alcohol (PVA), hydroxymethyl cellulose (HMC), carboxymethyl cellulose (CMC), and the like, or combinations thereof. In an embodiment, the binder used in a anode material 5 can comprise TEFLON, which is a PTFE commercially available from DuPont.

The anode material 5 can be coupled to the anode current collector 4, where the anode current collector 4 can include any of the current collectors described with respect to the cathode current collector 1. In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, and the like, or combinations thereof. Other porous collector configurations of the current collector will be appreciated by one of skill in the art in light of this disclosure. In some embodiments, the current collector can comprise a metal collector pocketed assembly, Other current collector configurations will be apparent to one of skill in the art, and with the help of this disclosure.

In an embodiment, the anode current collector 4 may further comprise a current collector tab. In such embodiment, the current collector tab may comprise a metal, nickel, copper, steel, and the like, or combinations thereof. Generally, the current collector tab provides a means of connecting the electrode to the electrical circuit of the battery. In an embodiment, the current collector tab is in electrical contact with an outer surface of the electrode. In an embodiment, the current collector tab is in electrical contact with less than about 0.2% of an outer surface of the electrode, alternatively less than about 0.5%, or alternatively less than about 1%.

In an embodiment, the anode material 5 may be pressed onto the anode current collector 4 to yield the anode. In an embodiment, the anode material 5 may be in the form of a dried sheet or a paste that can be pressed onto the current collector under high pressure, such as for example a pressure of from about 3,000 psi to about 10,000 psi, alternatively about 5,000 psi to about 9,000 psi, or alternatively about 6,000 psi to about 8,000 psi. In an embodiment, the anode material 5 may be pressed onto the anode current collector 4 such that the anode material 5 is in electrical contact with at least a portion of an outer surface of the anode current collector 4.

In an embodiment, the cell 10 can comprise an electrolyte that serves as an ion transporter such as an aqueous battery electrolyte or an aqueous electrolyte. In an embodiment, the electrolyte can comprises any suitable aqueous electrolyte comprising ionic conductivity and with a pH value between 1 and 14. In an embodiment, the electrolyte has a pH value of about 14, alternatively less than about 14, alternatively less than about 13, or alternatively less than about 12. In the case of rechargeable batteries, the electrolyte is important both for the active/discharging cycle of the battery (while the battery supplies a current) and for the recharging cycle when Zn may be electrodeposited to replenish the anode material.

In an embodiment, the electrolyte comprises a hydroxide such as potassium hydroxide, sodium hydroxide, lithium hydroxide, and the like, or combinations thereof, in a concentration of from about 1 wt. % to about 50 wt. %, alternatively from about 10 wt. % to about 40 wt. %, or alternatively from about 25 wt. % to about 35 wt. %, based on the total weight of the non-flow cell electrolyte solution. In an embodiment, the electrolyte comprises potassium hydroxide in a concentration of about 30 wt. %, based on the total weight of the electrolyte within the cell 10.

In an embodiment, the cell 10 may be assembled by using any suitable methodology. In an embodiment, the cell 10 may comprise at least one anode and at least one cathode. In an embodiment, the cell 10 may comprise more than one anode and more than one cathode, wherein the anodes and the cathodes are assembled in an alternating configuration, e.g., the anodes and the cathodes are sandwiched together in an alternating manner. For example, if a cell 10 comprises two cathodes and three anodes, the electrodes would be sandwiched together in an alternating manner: anode, cathode, anode, cathode, and anode. In some embodiments, the cell 10 can be constructed with one or more anodes and one or more cathodes having a rolled configuration. For example, an anode and cathode can be layered and then rolled to create a rolled structure with a cross-section comprising an anode, cathode, anode, cathode, etc. in an alternating configuration. As will be appreciated by one of skill in the art, and with the help of this disclosure, the number of electrodes in a cell 10 is dependent upon the desired parameters for such cell 10, including consideration such as the size and properties of the electrodes, such that anode and the cathode capacities may be at least approximately balanced.

As shown in FIG. 2, one or more optional gaskets 15 can be used within the cell 10. The gaskets 15 can serve to form a seal within the cell so that the ionic flow path between the electrodes passes through the separator 3. This may prevent potential channeling around the separator 3, which could allow zincate ions to bypass the separator and reach the cathode. A single gasket 15 can be used to seal one side of the separator 3, or a plurality of gaskets 15 can be used on one or both sides of the separator 3. When a gasket 15 is present, the separator 3 can be sized to cover the flow path defined by the gasket 15.

As described herein, the separator 3 forms an electrically insulating barrier between the anode and the cathode while being porous to allow for ionic flow in the electrolyte between the electrodes. By being placed between the electrodes, the separator 3 serves to prevent shorting that could occur due to direct electrical contact between the electrodes. As will be appreciated by one of skill in the art, the separator 3 allows the electrolyte, or at least a portion and/or component thereof, to pass (e.g., cross, traverse, etc.) through the electrode separator membrane, to balance ionic flow and sustain the flow of electrons in the battery. In this regard, the separator 3 serves to demarcates the cathode from the anode.

The separator 3 can be formed from one or more layers, where at least one layer can comprise a complexing agent for zincate ions. The complexing agent can serve to bind zincate ions and reduce the passage of zincate ions in the electrolyte through the separator 3 during use of the cell 10. In some embodiments, the complexing agent is able to reversibly react with zincate ions within the separator. In this case, the separator serves as a zincate reservoir, capturing and storing zincate ions during discharge and releasing them back to the electrolyte during charge.

In some embodiments, the inorganic materials that are particularly useful can be water insoluble (e.g., at least partially water insoluble, etc.) hydroxides of metals selected from the alkaline earth metal group. Suitable metal hydroxides can include, but are not limited to, magnesium hydroxide, calcium hydroxide, strontium hydroxide, barium hydroxide, or any combination thereof. In some embodiments, a binder can be used to retain the metal hydroxides. Any suitable binder can be used, including those described herein for use with the anode material and/or the cathode material. Suitable binders can include, but are not limited to, polytetrafluoroethylene, polyvinyl alcohol (PVA), polytetrafluoroethylene (PTFE), carboxymethyl cellulose (CMC), or any combination thereof.

In some embodiments, the separator 3 can comprise calcium hydroxide as its reaction with zincate ions follows a reversible and fast kinetics. For example, the presence of $Ca(OH)_2$ in the separator can serve to complex the zincate ions and form an insoluble complex calcium zincate. This process is represented by Eqn. [1]:

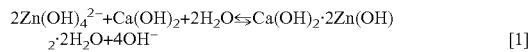

[1]

While described with respect to calcium hydroxide, other alkaline earth hydroxides may also be effective in complexing zincate ions within the separator 3.

The separator 3 may also comprise one or more additional layers. Suitable additional layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified polyolefin" refers to a polyolefin whose contact angle with water is less than 45°. In another embodiment, the contact angle with water is less than 30°. In yet another embodiment, the contact angle with water is less than 20°. The polyolefin may be modified by, for example, the addition of TRITON X100™ or oxygen plasma treatment. In some embodiments, the separator 3 can comprise a CELGARD® brand microporous separator. In an embodiment, the separator 3 can comprise a FS 2192 SG membrane, which is a polyolefin nonwoven membrane commercially available from Freudenberg, Germany.

The layers can be present in a variety of configurations. In some embodiments, one or more of the layers can be wrapped around the anode and/or cathode. In some embodiments, a multi-layer structure can be used between the electrodes, where a portion of any one or more of the layers can optionally extend around one or more of the electrodes.

Figure 3:
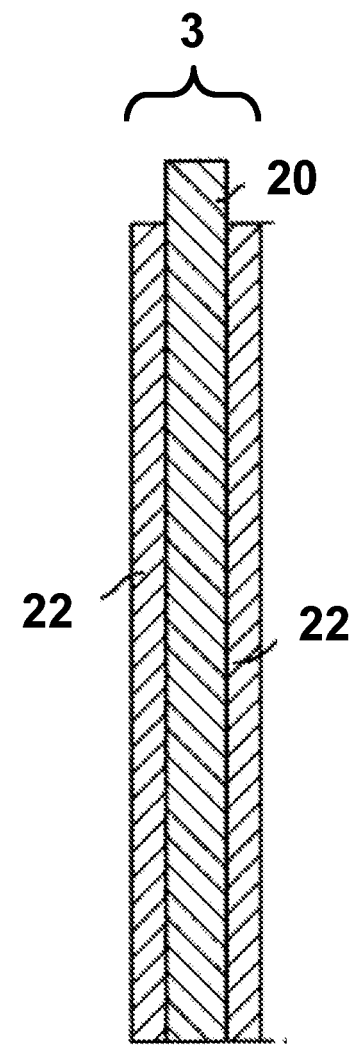
FIG. 3 is a schematic cross-sectional view of a separator according to an embodiment.

An embodiment of a multi-layer separator 3 is illustrated in FIG. 3. As shown, a plurality of layers can be present in the separator 3. In this embodiment, one or more layers 22 can be present with a layer of a zincate complexing agent layer 20 disposed there between. The outer layers can comprise a polymeric layer and can serve to retain the zincate complexing layer 20 there between. As zincate ions pass through one or more of the outer layers 22, the zincate ions can complex with the material in the zincate ion complexing layer 20 and be retained. During charging, these ions can be released back into the solution. This can reduce or prevent the passage of the zincate ions through the separator to pass to the cathode.

While FIG. 3 illustrates three layers, any plurality of layers can be used. In some embodiment, a plurality of zincate ion complexing agent layers can be present, and the zincate ion complexing agent layers can directly touch or they can be separated by one or more additional layers (e.g., polymeric film or membrane layers). When multiple anodes and/or cathodes are present, one or more of the separators as described herein can be present between each anode/cathode pair.

The separator can be manufactured using any suitable technique. In an embodiment, an inorganic separator fabrication method was developed. Initially, a mixture of the zincate ion complexing agent and a binder can be formed. For example, a mixture of calcium hydroxide (e.g., as a powder, granules, etc.) and Teflon as a binder can be mixed (e.g., wet-mixed) to form a paste. Any of the binders described with respect to the cathode and/or anode can be used, and in some embodiments, the binder can be a fluoropolymer. The complexing agent can be present in an amount of between about 50 wt. % to about 99 wt. % by weight of the mixture with the balance being a binder and/or mixing agent, though additional components can also be present. For example, the zincate ion complexing agent can comprise about 95 wt. % calcium hydroxide powders and about 5 wt. % of Teflon. The mixing agent can comprise water, isopropanol, ethanol, acetone, or any combination thereof. The wet mixture can then be rolled to form a thin layer or sheet. In an embodiment, the sheet can have a thickness ranging from 20 μm to 1 mm. In an embodiment, the sheet can be formed using a suspension of the mixture that can be spread over a tray as a sheet with controlled thickness between 20 μm to 1 mm. In some embodiments, the sheet can be formed by being thermally sprayed onto a substrate to form a layer with a thickness between about 20 μm to 1 mm. The layer can then be removed from the substrate before or after drying. The sheet can be dried in to produce the zincate ion complexing agent layer. In an embodiment, the sheet can be dried for a time between about 30 minutes and 24 hours at a temperature between about 40° C. and about 80° C. For example, the rolled sheet can be dried in an oven at about 60° C. for 5-10 hours. The resulting sheet of the zincate ion complexing agent can have a thickness between about 20 μm and about 1 mm. The sheet can have a density between about 50 mg/in$^2$ and about 1000 mg/in$^2$, a porosity between about 30% and about 70%, and an average pore size between about 100 nm and about 10 μm.

The separator comprising the zincate ion complexing agent as described herein is expected to have transport properties that are similar to those of polymeric separators alone. While the addition of extra layers within the separator can create some additional ionic impedance, the separator comprising the zincate ion complexing agent can have an ionic impedance that is at least about 80%, at least about 85%, at least about 90%, or at least about 95% of the ionic impedance of a separator without a zincate ion complexing agent present.

In use, the presence of the zincate ion complexing agent within the separator can reduce or prevent zincate ion transport through the separator. The overall transport rate of zincate ions through the separator may be affected by the electrolyte concentration and composition. In some embodiments, the presence of the zincate ion complexing agent within the separator can reduce the zincate ion transport through the separator (e.g., from the anode or anode chamber to the cathode or cathode chamber) by at least about 10%, at least about 20%, at least about 30%, at least about 40%, or at least about 50%.

The ability to reduce the zincate ion transport through the separator can result in an improved battery performance, particularly by extending battery performance after multiple cycles. The overall transport rate of zincate ions, and therefore the long-term performance of the cell, may be affected by the electrolyte concentration and composition. In some embodiments, the presence of the zincate ion complexing agent within the separator can improve the discharge capacity of the cell (e.g., the discharge capacity in Ah/g-$MnO_2$) by at least about 10%, at least about 20%, at least about 30%, at least about 40%, or at least about 50% as compared to a cell without the zincate ion complexing agent at greater than about 20 cycles for cells accessing about 100% of the $1^{st}$ electron capacity (e.g., for $MnO_2$ cells). For cells accessing the $2^{nd}$ electron capacity (e.g., up to about 80% of the $2^{nd}$ electron capacity), the presence of the zincate ion complexing agent in the separator can provide an improvement in discharge capacity (e.g., Ah/g-$MnO_2$) by at least about 10%, at least about 20%, at least about 30%, at least about 40%, or at least about 50% as compared to a cell without the zincate ion complexing agent at greater than about 200 cycles. In some embodiment, the presence of the zincate ion complexing agent in the separator can allow for a discharge capacity of at least about 60%, at least about 70%, or at least about 80% of the initial discharge capacity in cells accessing the $2^{nd}$ electron capacity (e.g., up to about 80% of the $2^{nd}$ electron capacity) for at least about 500, at least about 600, at least about 700, or at least about 800 cycles. Cells without the zincate ion complexing agent layer within the separator may fail prior to reaching 500 cycles due to the formation of insoluble compounds caused by the transport of the zincate ions to the cathode material during cycling. Thus, the presence of the zincate ion complexing agent layer within the separator may allow for the long-term operation of a cell having zinc in the anode and/or in cells in which $MnO_2$ is used as a cathode material and the $2^{nd}$ electron potential is being accessed.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

Figure 4:
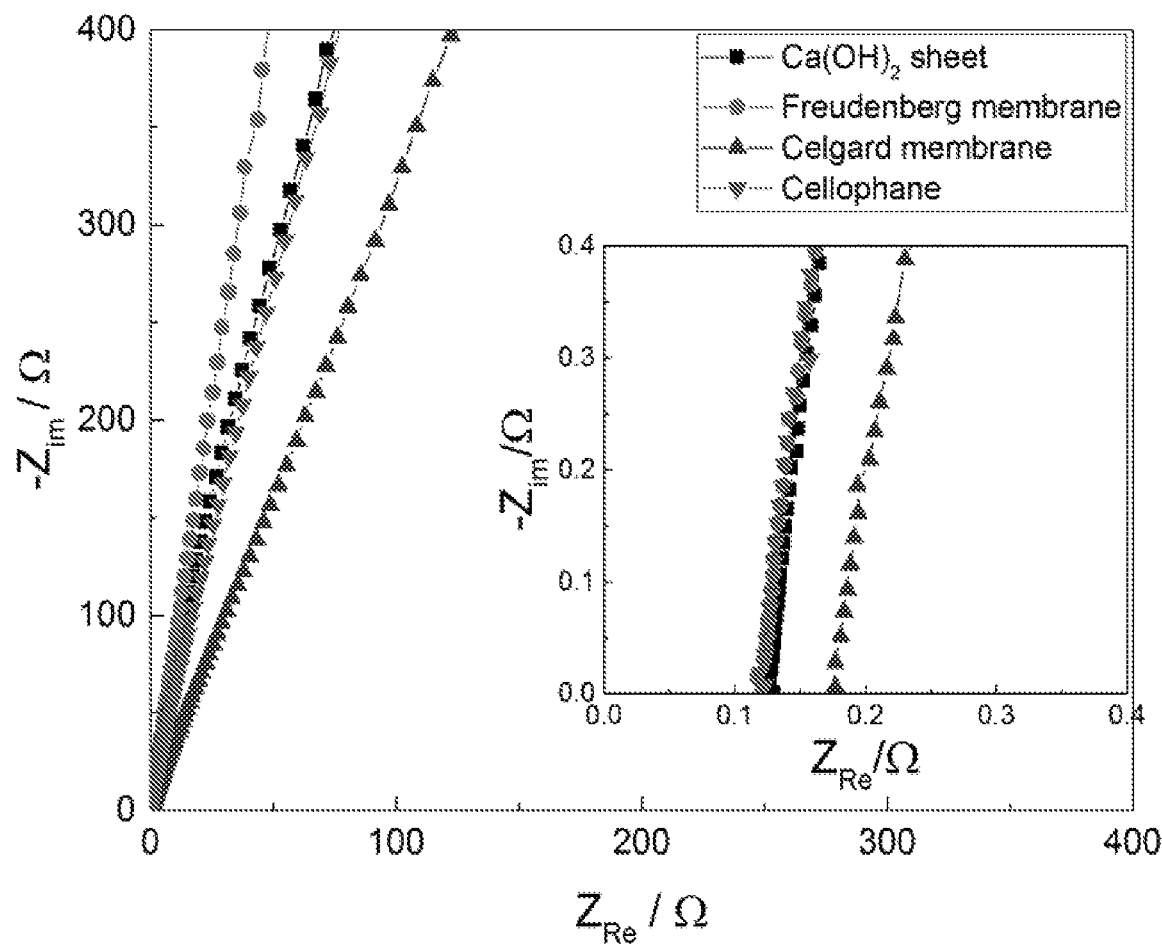
FIG. 4 is a Nyquist plot illustrating ionic conductivities of different separators in 25 wt % KOH solution.

Transport properties of hydroxyl ions through a calcium hydroxide sheet and other commercial separators, including Celgard (Model No. 5550), Freudenberg (Model No. FSWR104), and cellophane (Model No. 350PØØ) were evaluated through the measurement of ionic conductivities with an AC impedance method in 25 wt % KOH solution. FIG. 4 showed the Nyquist plot for each separator. The bulk resistance of each electrolyte-soaked separator was determined from the intersection of the straight line in the high frequency range with the real part axis, and the conductivities could be calculated accordingly. The results showed that all the tested separators exhibited comparable ionic conductivities, which meant comparable performances with regards to hydroxyl ions transport.

Example 2

Figure 5:
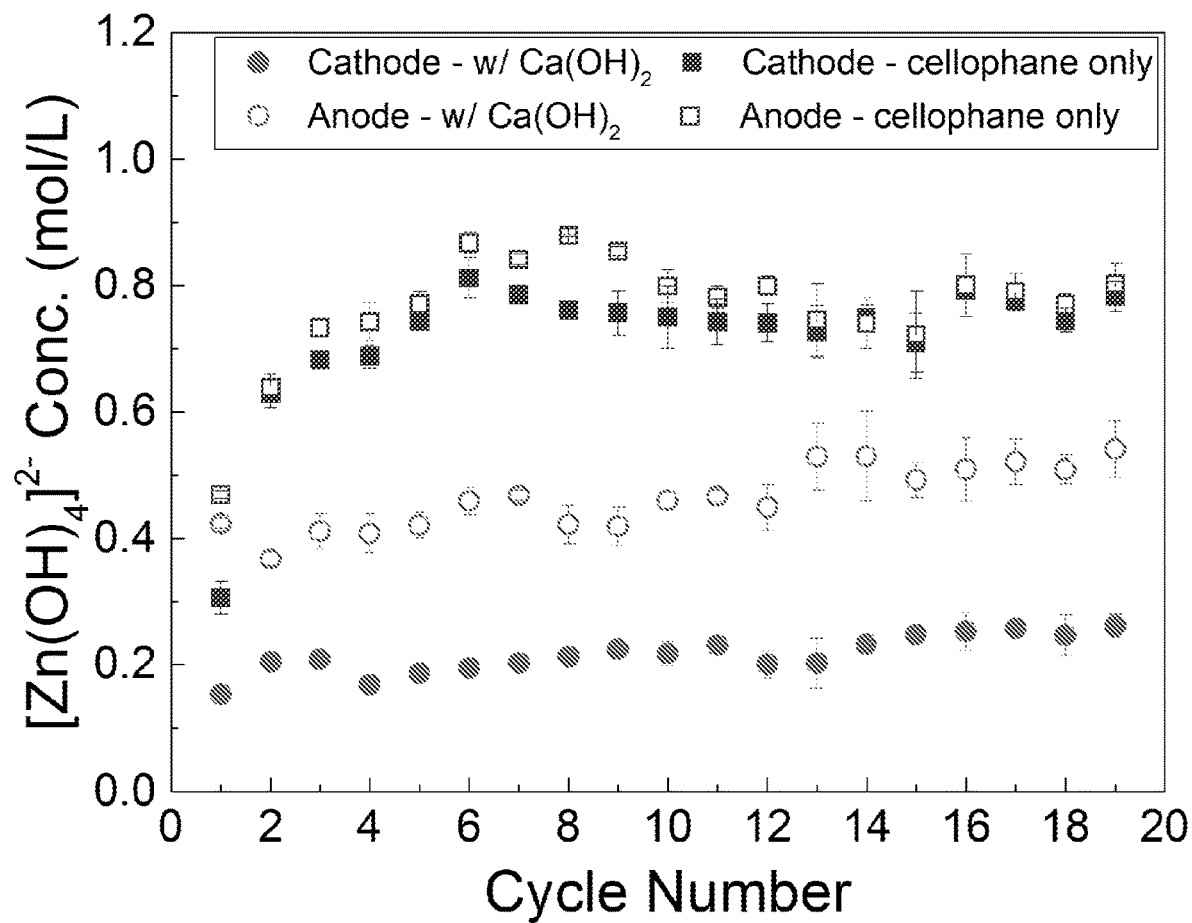
FIG. 5 is a graph illustrating zincate ion concentrations in different chambers at the end of each discharge half-cycle, with three layers of cellophane (squares) or two layers of cellophane and one layer of $Ca(OH)_2$ sheet (circles) applied.

Transport properties of zincate ions during cycling were measured with a prismatic testing cell assembled as shown in FIG. 2. The cell was divided into two chambers by separators, with a pasted Zn anode and a sintered NiOOH cathode. The cell was assembled in fully charged state, and cycled at the same rate and depth-of-discharge (DOD) as the Zn/$MnO_2$ electrochemical cells discussed in Example 3. At the end of each discharge half-cycle, the zincate concentration in each chamber was measured by titration. The results are shown in FIG. 5, which qualitatively show the performances of cellophane and Ca(OH)$_2$ sheet in blocking zincate ions. The cellophane showed no zincate blocking effect at all, as the zincate concentration in the cathode chamber increased quickly and equilibrated with that in the anode chamber at around 0.8 M, which was much higher than its saturating concentration (0.45 M in 25 wt % KOH) due to the well-known supersaturation effect of zincate ions in alkaline electrolytes. But with a Ca(OH)$_2$ layer added, the zincate concentration in the cathode chamber was lowered to around 0.2 M, while in the anode chamber, it stabilized at its saturating concentration. It is thought that the substantially decreased zincate concentration resulted from the fact that a large portion of the free zincate ions was trapped within the Ca(OH)$_2$ layer, where an insoluble complex calcium zincate was formed, according to equation 1 as described herein.

Example 3

Cells were assembled with pasted zinc electrodes as anodes, and electrolytic $MnO_2$ (EMD) electrodes as cathodes. The Zn anode in the Ca(OH)$_2$-free cell was wrapped with three layers of cellophane, while in the cell with a Ca(OH)$_2$ interlayer, a piece of Ca(OH)$_2$ sheet was inserted between the Zn electrode and two layers of cellophane at each side. In all cells, the $MnO_2$ electrode was wrapped with 2 layers of cellophane. Each cell consisted of two anodes and one cathode. In addition, a half cell with a $MnO_2$ working electrode cycling versus an Hg/HgO reference electrode and a sintered NiOOH counter electrode was also tested for the zincate-free case. A 25 wt % KOH solution was used as the electrolyte.

Figure 6:
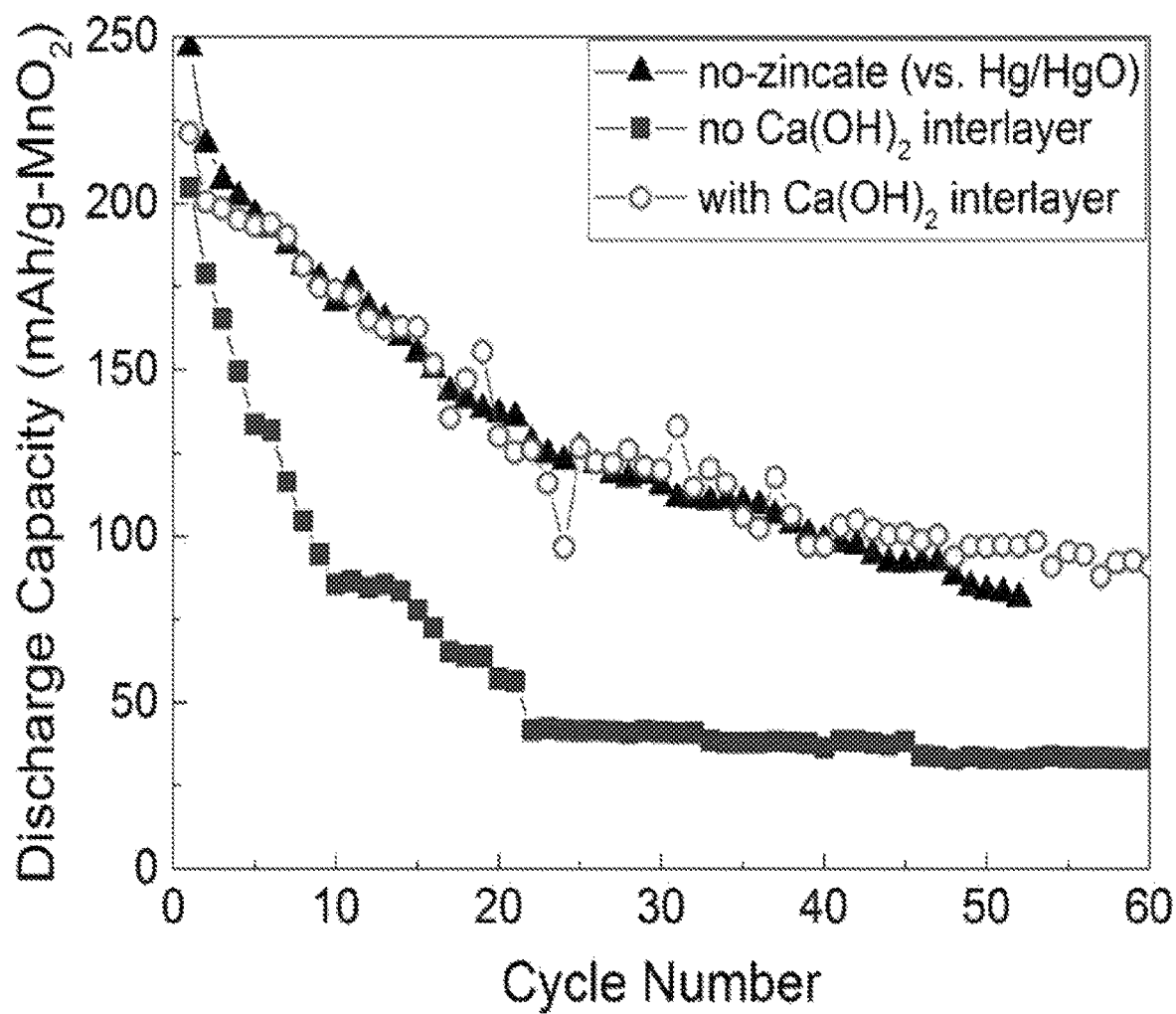
FIG. 6 is a graph illustrating specific discharge capacity curves of electrolytic manganese dioxide (EMD) cathode cells with different separators applied.

The cells were cycled galvanostatically at the rate of C/20 (15 mA/g $MnO_2$). With a cutoff voltage at 1V, the Zn-EMD cell was considered as discharged to full one electron capacity of $MnO_2$. The capacity curves are shown in FIG. 6. At such a high DOD, various mechanisms other than zinc contamination may lead to cell failure, as shown by the fading capacity curve of the reference cell with no zincate ions at all. With the addition of the zincate ions, as shown by the cell with only standard cellophane separators, the capacity fading was conspicuously accelerated, as only 20% of the initial capacity remained after only 20 cycles. However, when a Ca(OH)$_2$ interlayer was applied to produce a reduced zincate concentration, the cell was able to slow down its capacity fading, showing a curve similar to the reference cell, and achieve more than 60 cycles with a capacity retention higher than 90 mAh/g-MnO$_2$.

Material characterizations were conducted after stopping cells at fully charged states. The zincate concentrations in the bulk electrolyte were measured. An average of 0.20 M was detected for a cell with Ca(OH)$_2$ interlayers, while a concentration around 0.65 M was normally observed in a Ca(OH)$_2$-free cell.

Figure 7:
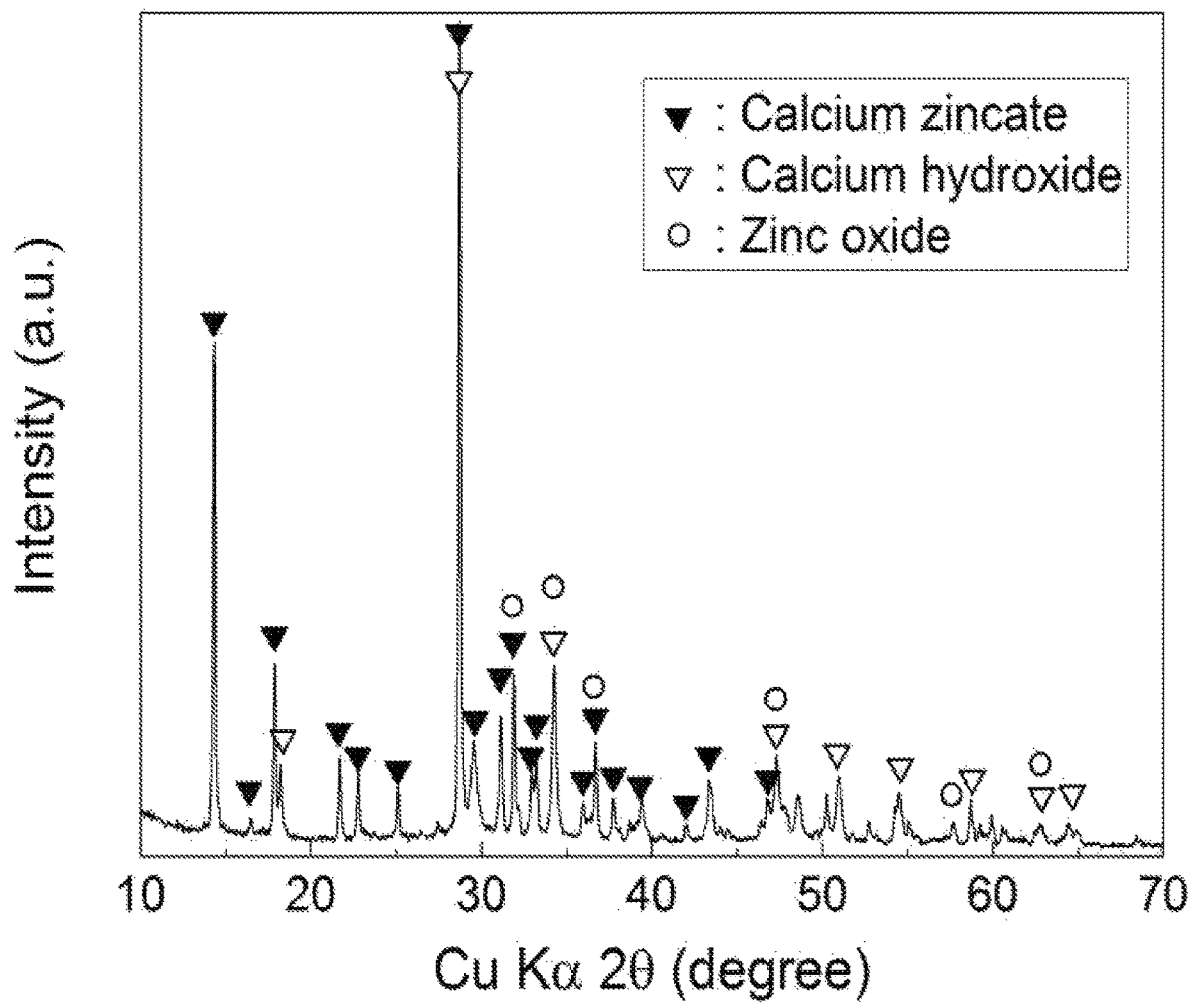
FIG. 7 is a graph illustrating the X-ray diffraction pattern of a $Ca(OH)2$ sheet from a cycled cell.
Figure 8:
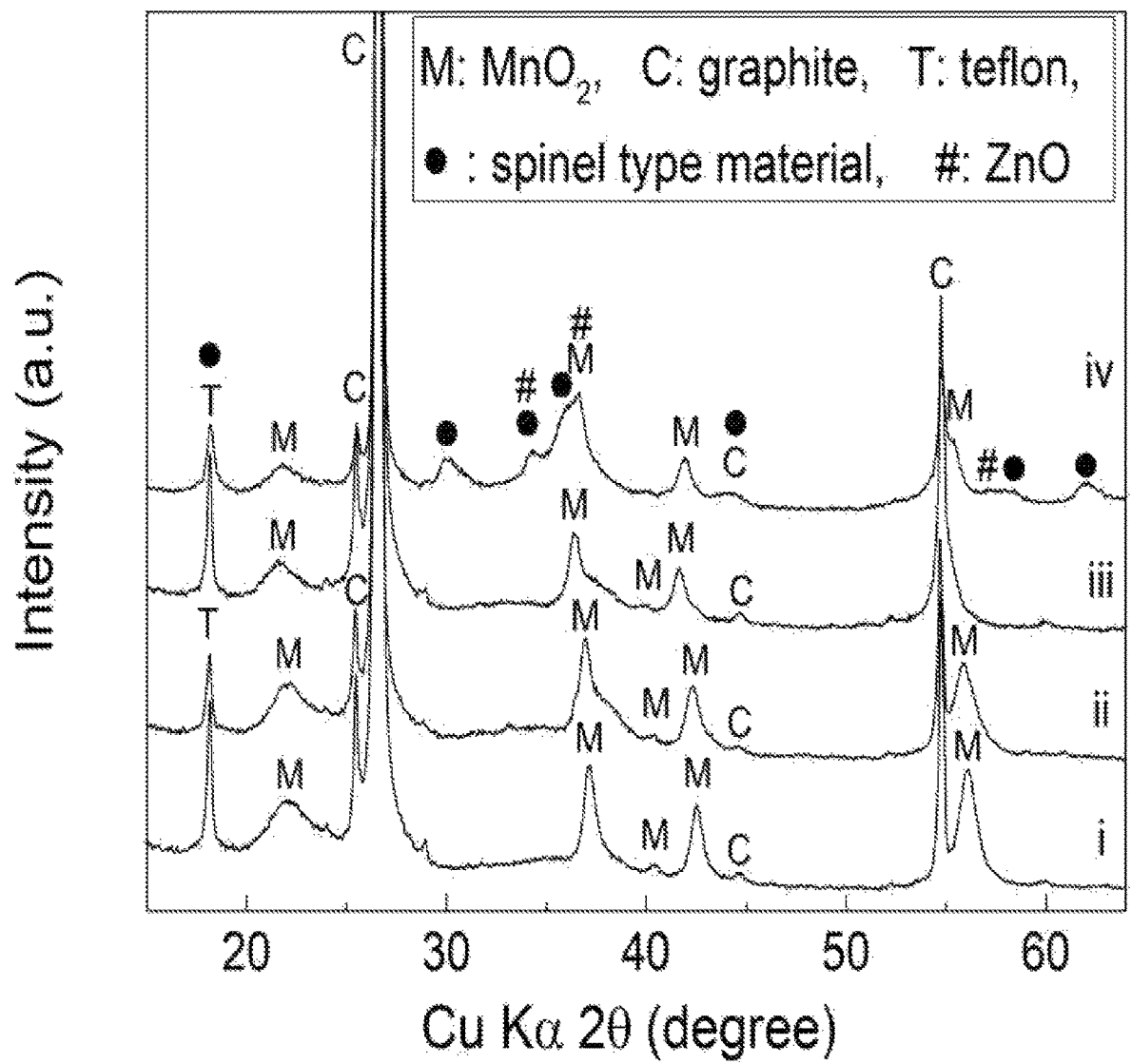
FIG. 8 is a graph illustrating X-ray diffraction patterns of different EMD electrodes i) uncycled, ii) cycled vs. a Hg/HgO reference electrode, iii) cycled in a cell with a $Ca(OH)2$ interlayer and iv) cycled in a $Ca(OH)2$-free cell.

The X-ray diffraction (XRD) pattern of a Ca(OH)$_2$ sheet from a cycled battery as displayed in FIG. 7 showed that it was mostly converted to calcium zincate, with some unreacted Ca(OH)$_2$ remained, as well as a very small amount of ZnO detectable. XRD patterns of the cycled MnO$_2$ electrodes are shown in FIG. 8. The MnO$_2$ electrodes from the reference cell and the cell with Ca(OH)$_2$ interlayers presented large similarities with the uncycled one, except for subtle changes like a broadening of the EMD peaks, which suggested the presence of some amorphous or poorly crystalline phases, and a slight shift of these peaks toward smaller angles, indicating an increase in the lattice parameters. No extra peaks belonging to new material phases could be observed, and the main EMD structure seemed to be preserved. On the contrary, the cycled MnO$_2$ electrode from the Ca(OH)$_2$-free cell showed a completely different XRD pattern. The reflections corresponding to the γ-MnO$_2$ phase vanished while new reflections belonged to spinel-type materials became predominant. This spinel type material could be either hausmannite or hetaerolite, as they have nearly identical structures with d-spacings differ by only 0.04 Å.

In order to identify the spinel-type material, the XRD work was completed with EDS elemental analysis. An average Zn/Mn ratio of around 1:30 was measured on the surface of the cathode from a cell containing a Ca(OH)$_2$ interlayer, while a ratio of 1:3 was detected for the Ca(OH)$_2$-free cell, which evidenced the existence of hetaerolite.

Figure 9:
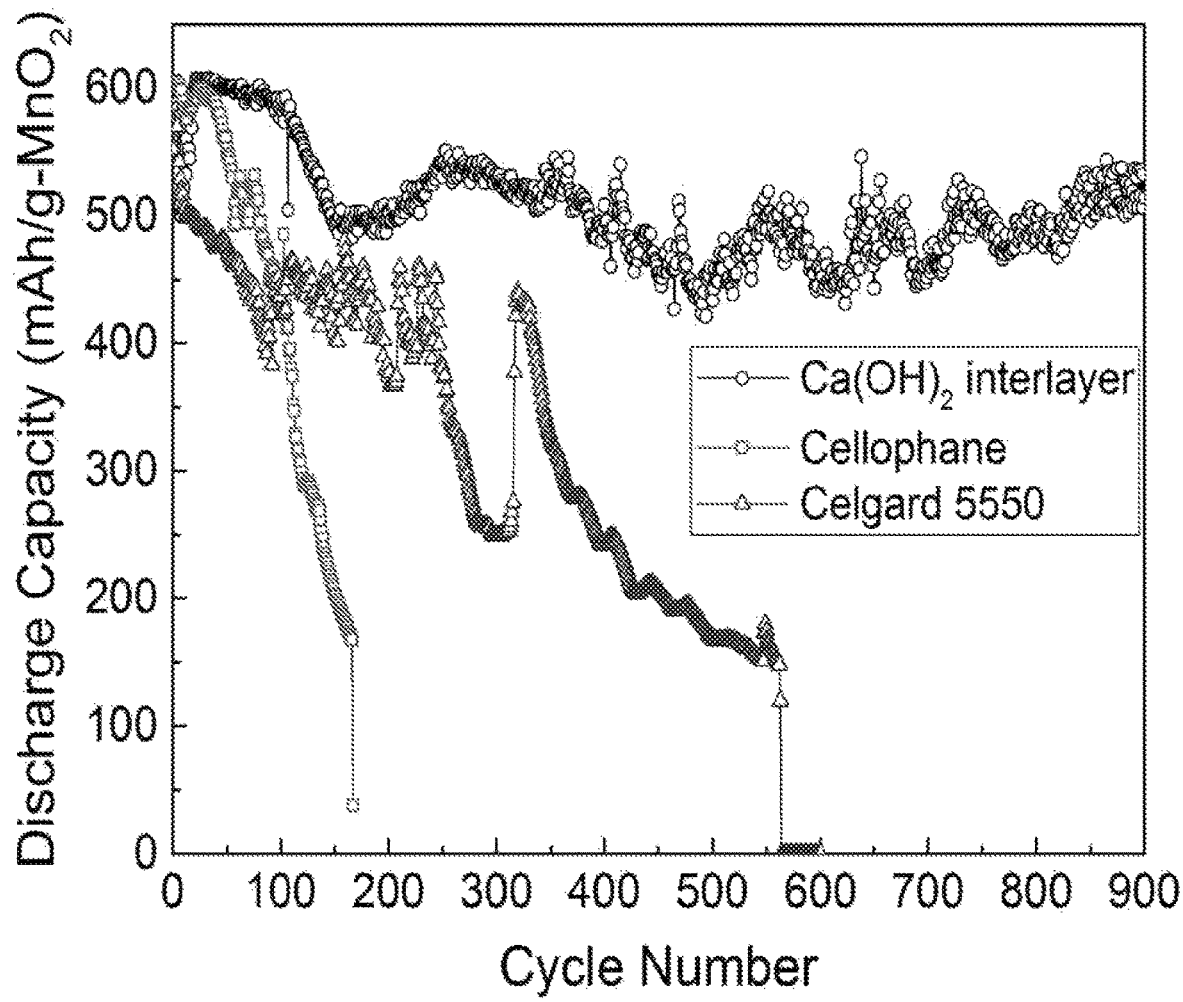
FIG. 9 is a graph illustrating specific discharge capacity curves of cells with lab-modified $MnO2$ cathodes where the 2nd electron capacity is accessed with different separators.

For cells with the lab-modified MnO$_2$ electrodes trying to access the $2^{nd}$ electron capacity, the capacity curves are shown in FIG. 9. With a Ca(OH)$_2$ membrane applied, 80% of the full 2-electron capacity could be retained for more than 800 cycles, which showed a much better performance in comparison to cells with Celgard or cellophane as the separator.

The innovation based on the incorporation of the zincate ion complexing agent within the separator provides comparable properties with the other commercial separators with regards to hydroxyl ions transport property, but can also lower the amount of zincate transported through the membrane. Tests in cycling batteries proved its effectiveness as a zincate blocking separators by showing a lower capacity fade in certain electrolyte compositions. Analyses on X-ray diffraction patterns and EDS elemental analysis provides further evidence of the alleviation of the hetaerolite problem. Thus, the use of the zincate ion complexing agent within the separator provides selectivity for blocking inter-electrode zincate transport. With a lower zincate concentration on the cathode side, cell capacity fading is reduced or alleviated, and a longer cycle life is achievable.

Having described various devices and processes herein, specific embodiments can include, but are not limited to:

In a first embodiment, a rechargeable alkaline battery comprises: an anode comprising zinc; a cathode; and a separator disposed between the anode and the cathode, the separator comprising a water-insoluble metal hydroxide.

A second embodiment can include the rechargeable alkaline battery of the first embodiment, wherein the water-insoluble metal hydroxide is selected from the group consisting of: magnesium hydroxide, calcium hydroxide, strontium hydroxide, barium hydroxide, and any combination thereof.

A third embodiment can include the rechargeable alkaline battery of the first or second embodiment, wherein the separator comprises a polymeric binder in which the water-insoluble metal hydroxide is dispersed, wherein the polymeric binder is selected from the group consisting of polytetrafluoroethylene, polyvinyl alcohol (PVA), polytetrafluoroethylene (PTFE), carboxymethyl cellulose (CMC), and any combination thereof.

A fourth embodiment can include the rechargeable alkaline battery of any of the first to third embodiments, wherein the separator comprises 70 wt. % to 99 wt. % of the water-insoluble metal hydroxide and 1 wt. % to 30 wt. % of a binder.

A fifth embodiment can include the rechargeable alkaline battery of any of the first to fourth embodiments, wherein the cathode comprises manganese dioxide.

A sixth embodiment can include the rechargeable alkaline battery of any of the first to fifth embodiments, wherein 1 to 5 layers of the water-insoluble metal hydroxide are inserted either alone or in between polymeric separator membranes.

A seventh embodiment can include the rechargeable alkaline battery of any of the first to sixth embodiments, wherein the insoluble metal hydroxide is formed as a membrane, and wherein the membrane can be applied alone or together with one or more commercial separators.

An eighth embodiment can include the rechargeable alkaline battery of any of the first to seventh embodiments, wherein the commercial separators are Celgard 5550, Celgard 3401, Celgard 3501, Freudenberg Nonwovens (all models), cellophane (all models), or Pellon (all models).

A ninth embodiment can include the rechargeable alkaline battery of any of the first to eighth embodiments, wherein the water-insoluble metal hydroxide is disposed next to the electrode with surface contact, or isolated from the electrode with one or more layers of polymeric separator layers.

A tenth embodiment can include the rechargeable alkaline battery of any of the first to ninth embodiments, wherein the anode is wrapped with the separator, sealed in a pocket formed from the separator with a heat seal.

An eleventh embodiment can include the rechargeable alkaline battery of any of the first to tenth embodiments, further comprising an electrolyte, wherein the electrolyte comprises of potassium hydroxide with a concentration between 10-50 wt. %.

A twelfth embodiment can include the rechargeable alkaline battery of any of the first to eleventh embodiments, wherein the anode and the cathode each comprise a current collector, and wherein the current collector is a copper mesh, a copper foil, a nickel mesh, a nickel foil, a copper plated nickel mesh or foil, or a nickel-plated copper mesh or foil.

A thirteenth embodiment can include the rechargeable alkaline battery of the twelfth embodiment, wherein the anode or the cathode is formed by pressing an anode material or a cathode material, respectively, on to the current collector at 100-40000 psi.

In a fourteenth embodiment, a method for fabricating a separator comprises: combining an inorganic material with a binder to form a mixture; and forming the mixture into a sheet of separator material, wherein the separator material is used in a rechargeable alkaline battery.

A fifteenth embodiment can include the method of the fourteenth embodiment, wherein forming the mixture into the sheet comprises casting, rolling, or thermal spraying.

A sixteenth embodiment can include the method of the fourteenth or fifteenth embodiment, wherein the inorganic material comprises a water insoluble hydroxide of metals selected from the alkaline earth group.

A seventeenth embodiment can include the method of any of the fourteenth to sixteenth embodiments, wherein the binder comprises TEFLON, polyvinyl alcohol (PVA), polytetrafluoroethylene (PTFE), carboxymethyl cellulose (CMC), or any combination thereof.

An eighteenth embodiment can include the method of any of the fourteenth to seventeenth embodiments, wherein the separator comprises 70 wt. % to 99 wt. % of the inorganic material, and 1 wt. % to 30 wt. % of the binder.

A nineteenth embodiment can include the method of any of the fourteenth to eighteenth embodiments, wherein combining the inorganic material and the binder comprises wet mixing the mixture with at least one solvent, wherein the at least one solvent comprises water, isopropanol, ethanol, acetone, or any combination thereof.

A twentieth embodiment can include the method of any of the fourteenth to nineteenth embodiments, wherein the sheet has a thickness ranging from 20 μm to 1 mm.

A twenty first embodiment can include the method of any of the fourteenth to twentieth embodiments, wherein a suspension of the mixture can be spread over a tray as a sheet with controlled thickness between 20 μm to 1 mm.

A twenty second embodiment can include the method of any of the fourteenth to twenty first embodiments, wherein the sheet is dried for a time between 30 minutes and 24 hours at a temperature between 40° C. and 80° C.

A twenty third embodiment can include the method of any of the fourteenth to twentieth embodiments, wherein the mixture can be thermal sprayed onto a substrate to form a layer with a thickness between 20 μm to 1 mm.

A twenty fourth embodiment can include the method of any of the fourteenth to twenty third embodiments, wherein the sheet has a thickness between 20 μm to 1 mm, a density between 50 mg/in$^2$ to 1000 mg/in$^2$, a porosity between 30% to 70%, and an average pore size between 100 nm to 10 μm.

A twenty fifth embodiment can include the method of any of the fourteenth to twenty fourth embodiments, further comprising: incorporating the sheet of the separator material into the rechargeable alkaline battery, wherein the rechargeable alkaline battery comprises an anode, and wherein the anode of the rechargeable alkaline battery is a pasted mixture comprising zinc and zinc oxide on a metallic current collector.

A twenty sixth embodiment can include the method of the twenty fifth embodiment, wherein the anode consists of 70-90 wt. % Zn, 5-25 wt. % ZnO, and 1-10 wt. % binder.

A twenty seventh embodiment can include the method the twenty fifth or twenty sixth embodiment, wherein the rechargeable alkaline battery comprises a cathode, wherein the cathode of the rechargeable alkaline battery comprises a pasted manganese dioxide electrode, a sintered nickel electrode, or a pasted nickel electrode.

A twenty eighth embodiment can include the method of the twenty seventh embodiment, wherein the cathode of the rechargeable alkaline battery is a manganese dioxide cathode, and wherein the manganese dioxide cathode consists of 30-85 wt. % MnO$_2$, 1-50 wt. % conductive carbon, and 1-10 wt. % binder.

A twenty ninth embodiment can include the method of any of the twenty fifth to twenty eighth embodiments, wherein each cathode or anode is wrapped by 1 to 5 layers of separator membrane.

A thirtieth embodiment can include the method of any of the fourteenth to twenty ninth embodiments, further comprising: capturing zincate ions produced by the anode in the separator.

In a thirty first embodiment, a method of operating a rechargeable alkaline battery comprises: discharging the rechargeable alkaline battery, wherein the rechargeable alkaline battery comprises: an anode comprising zinc, a cathode comprising manganese dioxide, a separator disposed between the anode and the cathode, the separator comprising a water-insoluble metal hydroxide, and an electrolyte flooding the anode, the cathode, and the separator; producing zincate ions at the anode; capturing the zincate ions in the separator prior to the zincate ions migrating from the anode to the cathode A thirty second embodiment can include the method of the thirty first embodiment, further comprising: recharging the rechargeable alkaline battery; and releasing the zincate ions into the electrolyte adjacent the anode during the recharging.

A thirty third embodiment can include the method of the thirty first or thirty second embodiment, wherein capturing the zincate ions comprising forming an insoluble zincate complex within the separator A thirty fourth embodiment can include the method of any of the thirty first to thirty third embodiments, further comprising: cycling the rechargeable alkaline battery a plurality of times, wherein at least a portion of a 2nd electron capacity of the manganese dioxide is accessed during the cycling; and retaining at least about 50% of an initial discharge capacity in the rechargeable alkaline battery during the cycling.

A thirty fifth embodiment can include the method of any of the thirty first to thirty fourth embodiments, wherein cycling the rechargeable alkaline battery a plurality of times comprises cycling the rechargeable alkaline battery at least 500 times.

A thirty sixth embodiment can include the method of the thirty fourth embodiment, wherein cycling the rechargeable alkaline battery a plurality of times comprises cycling the rechargeable alkaline battery at least 200 times.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R.

What is claimed is:

1. A method comprising:
   combining an inorganic material with a binder to form a mixture, wherein the inorganic material comprises a water insoluble hydroxide of metals selected from the alkaline earth group; and
   forming the mixture into a free-standing dried sheet of separator material, wherein the free-standing dried sheet of separator material comprises 70 wt. % to 99 wt. % of the inorganic material, and 1 wt. % to 30 wt. % of the binder, and wherein the inorganic material is selected from the group consisting of: magnesium hydroxide, calcium hydroxide, strontium hydroxide, barium hydroxide, and any combination thereof; and
   incorporating the free-standing dried sheet into a rechargeable battery.

2. The method of claim 1, wherein the binder comprises polyvinyl alcohol (PVA), polytetrafluoroethylene (PTFE), carboxymethyl cellulose (CMC), or any combination thereof.

3. The method of claim 1, wherein combining the inorganic material and the binder comprises wet mixing the mixture with at least one solvent, wherein the at least one solvent comprises water, isopropanol, ethanol, acetone, or any combination thereof.

4. The method of claim 1, wherein the free-standing dried sheet has a thickness between 20 μm to 1 mm, a density between 50 mg/in$^2$ to 1000 mg/in$^2$, a porosity between 30% to 70%, and an average pore size between 100 nm to 10 μm.

5. The method of claim 1, wherein the rechargeable alkaline battery comprises an anode, and wherein the anode of the rechargeable alkaline battery is a pasted mixture comprising zinc and zinc oxide on a metallic current collector.

6. The method of claim 5, wherein the pasted mixture consists of 70-90 wt. % Zn, 5-25 wt. % ZnO, and 1-10 wt. % of an anode binder.

7. The method of claim 5, wherein the rechargeable alkaline battery comprises a cathode, wherein the cathode of the rechargeable alkaline battery comprises manganese dioxide, sintered nickel, or pasted nickel.

8. The method of claim 7, wherein the cathode consists of 30-85 wt. % MnO$_2$, 1-50 wt. % conductive carbon, and 1-10 wt. % a cathode binder.

9. The method of claim 7, wherein the cathode or the anode is wrapped by the free-standing dried sheet of the separator material.

* * * * *